Feb. 13, 1951

C. H. WHITCROFT 2,541,626

CARRIER

Filed Feb. 12, 1946

3 Sheets-Sheet 1

FIG.I.

INVENTOR.
CLARENCE H. WHITCROFT
BY
*Whittemore Hulbert & Belknap,*
ATTORNEYS

Feb. 13, 1951  C. H. WHITCROFT  2,541,626
CARRIER
Filed Feb. 12, 1946  3 Sheets-Sheet 2

INVENTOR.
CLARENCE H. WHITCROFT
BY
ATTORNEYS

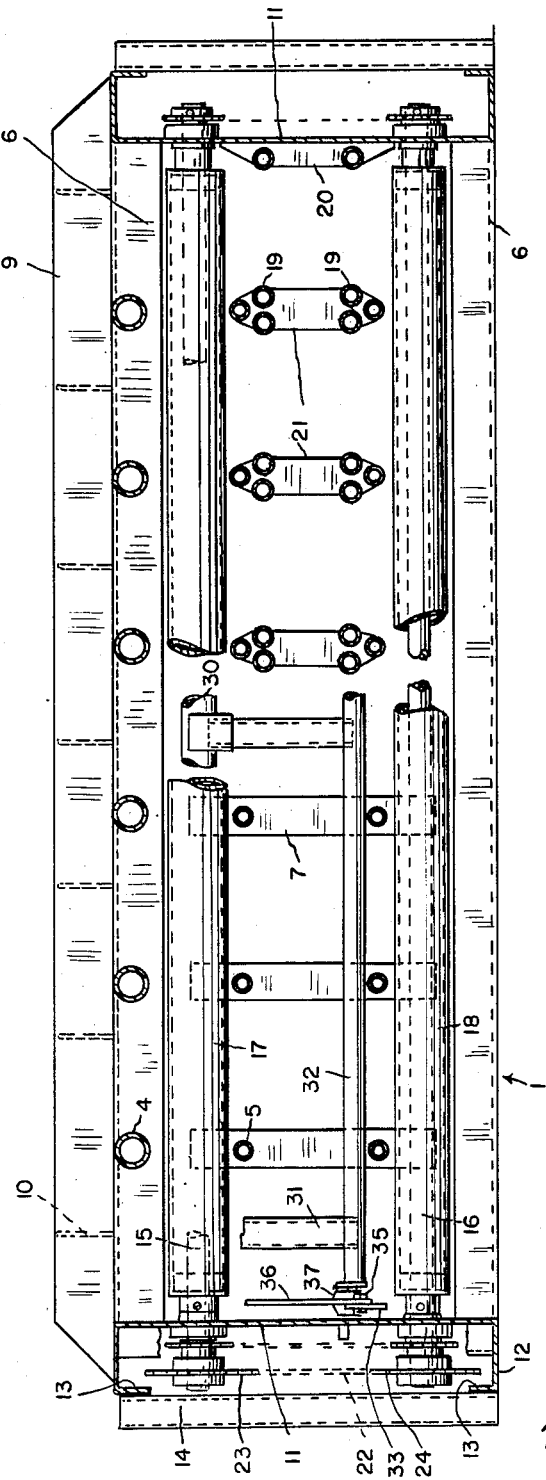

Patented Feb. 13, 1951

2,541,626

UNITED STATES PATENT OFFICE 2,541,626

CARRIER

Clarence H. Whitcroft, Highland Park, Ill., assignor to Mechanical Handling Systems, Inc., Detroit, Mich., a corporation of Michigan Application February 12, 1946, Serial No. 647,118

6 Claims. (Cl. 214—1)

The invention relates to carriers and refers more particularly to carriers for annular work members, such as bags used in the manufacture of tire casings.

The invention has for one of its objects to provide an improved carrier which is simple in construction and may be manufactured at relatively low cost and is efficient in operation.

The invention has for another object to so construct the carrier that it has rollers for supporting and guiding the annular work members and, further, has power means for driving certain of the rollers to thereby rotate the annular work members.

The invention has for a further object to provide a carrier which is constructed to carry a plurality of annular work members and is provided with means movable upwardly into engagement with the annular work members to raise them to a position to be simultaneously discharged from the hanger.

Figure 1:
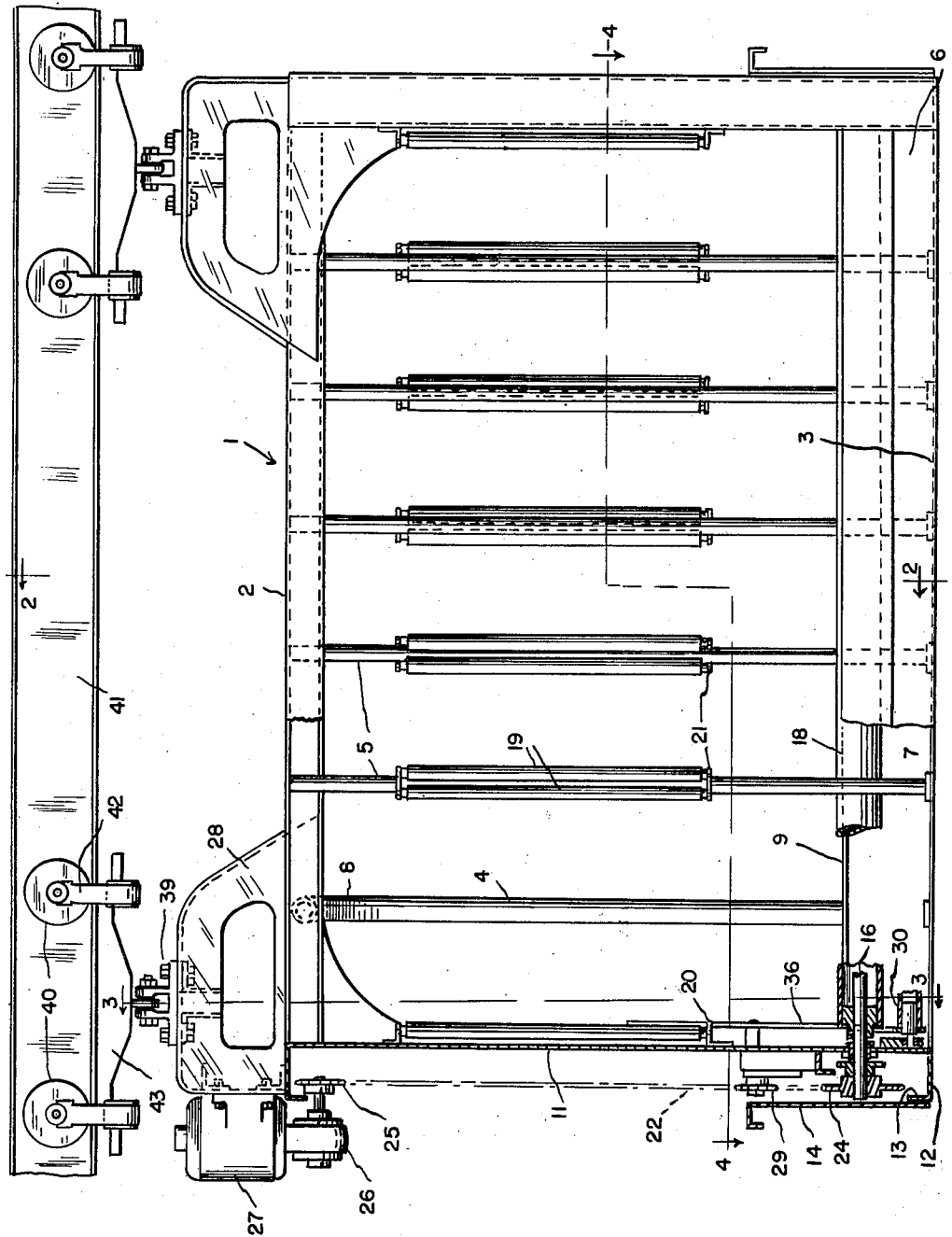
Figure 2:
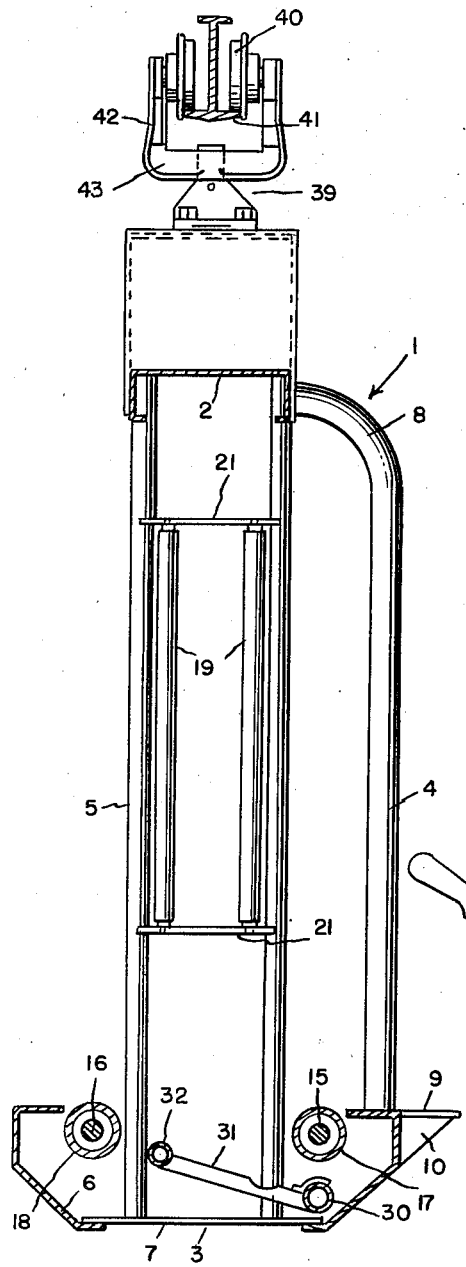
Figure 3:
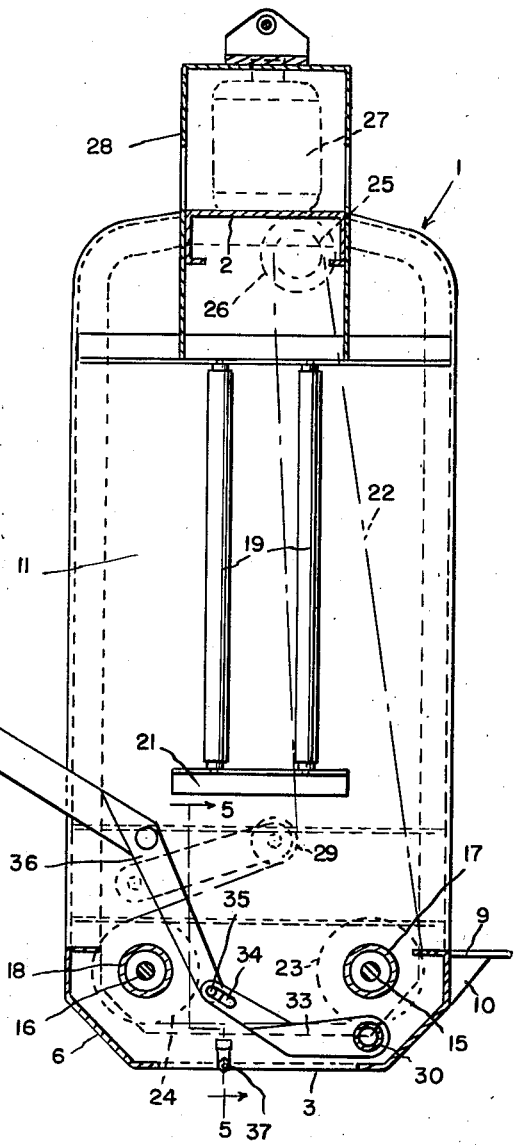

These and other objects of the invention will become apparent from the following description, taken in connection with the accompanying drawings, in which Figure 1 is a side elevation, partly broken away and partly in section, of a carrier embodying the invention;

Figures 2, 3 and 4 are cross sections on the lines 2—2, 3—3 and 4—4, respectively, of Figure 1;

Figure 5 is a cross section on the line 5—5 of Figure 3.

The carrier is designed particularly for use with another carrier having a plurality of compartments and is constructed to carry a plurality of work members at the same time so that the same sequence or order may be maintained in both carriers. In the present instance the carrier is particularly designed to carry a plurality of annular work members, such as bags used in the manufacture of tire casings, while the work members are being processed.

The carrier comprises the rack 1 having a frame formed of the longitudinally extending horizontal top and bottom members 2 and 3, respectively, and the vertical members 4 and 5. The top member is in the nature of an inverted channel, while the bottom member is formed of the spaced generally channel-shaped members 6 opening toward each other and the plate 7 secured to the bottom flanges of the members 6. The vertical members 4 are pipes secured at their lower ends to the upper flanges of the members 6 and having curved upper end portions 8 which are secured to the side flanges of the top member 2. These pipes are spaced longitudinally and at one side of the frame and they are secured to the top and bottom members preferably by welding. The vertical members 5 are pipes secured at their lower ends to the plate 7 and at their upper ends to the web of the top member 2 preferably by welding. The pipes 5 are arranged in pairs with each pair in alignment with a pipe 4. The pipes 5 are also spaced from each other transversely of the frame and, furthermore, are spaced from the adjacent pipes 4 transversely of the frame. 9 is a plate at the outer sides of the side member 6 to which the pipes 4 are secured, its upper face substantially flush with the upper face of the upper flange of this side member. This plate is supported by means of the triangular shaped pieces 10 which are preferably welded to the plate and the associate side member. 11 are end plates secured as by welding to the ends of the top and bottom members 2 and 3, respectively. Each end plate has at its edges the transverse flanges 12 which terminate in the flanges 13 spaced from the main body of the end plate. 14 are other vertical plates secured to the lower portions of the side flanges and to the bottom flange and cooperating with the end plates to form upwardly opening pockets at the ends of the rack.

15 and 16 are shafts extending longitudinally of the rack and through the end plates 11 within the trough formed by the bottom member 3. 17 and 18 are rollers formed of tubular members encircling the shafts 15 and 16, respectively, between the end plates 11 and fixedly secured to these shafts to rotate therewith. The shafts and the rollers are located at the outer sides of the pipes 5 and the upper portions of the rollers are located above the upper flanges of the members 6 to engage and support the annular work members, such as the bags used in the manufacture of tire casings. Vertical rollers 19 are provided upon the end plates 11 and also upon the pipes 5 for engaging the sides of the annular work members to guide the same. These rollers are arranged in pairs spaced transversely of the rack and the rollers upon the end plates are carried by the brackets 20 secured to the end plates and the rollers upon the pipes are carried by the plates 21 which extend between and are secured to the pipes of each pair. The shafts 15 and 16 are positively driven to rotate in the same direction by suitable means, such as the sprocket chain 22, which extends around the sprockets 23 and 24 secured to one end of each of the shafts 15 and 16, respectively. The chain also extends around the sprocket 25 which is driven by the reducing gear 26 which, in turn, is driven by the electric motor 27. The motor is mounted upon the adjacent bracket 28, there being two of these brackets secured to the top member 2 at its ends. 29 is an idler sprocket engaging the sprocket chain and serving to maintain the desired tautness.

For the purpose of discharging the annular work members, means is provided for engaging all of these members between the supporting rollers 17 and 18 and raising the work members to a position such that they will discharge. More in detail, 30 is a shaft extending longitudinally of the frame and journaled in the end plates 11 below the shaft 15. 31 are levers fixedly secured to the shaft between the end plates 11 and 32 is a shaft secured to the free ends of the levers 31 and movable upwardly into engagement with the annular work members to raise the same to a position where they may be easily discharged upon upward swinging of the levers. The levers are adapted to be swung upwardly by means of the lever 33 which is fixedly secured at one end to the shaft 30 and has at its other end the longitudinal slot 34 through which extends a pivot 35 for connecting the lever 33 to the lever 36, which latter is pivoted intermediate its ends upon the frame.

The pockets formed by the end plates 11 and the plates 14 may be automatically drained by the swing check valves 37, while the trough formed by the bottom member 3 and located between the end plates 11 may be drained by suitable drain holes 38.

In the present instance the processing of the bags while mounted upon the carrier comprises subjecting these bags to a liquid dipping compound. To accomplish this processing, the carrier may be supported either from above or below and lowered to a position to submerge the cross sections of the bags, leaving the water connections or stems of the bags above the level of the liquid. While in lowered position the supporting rollers are driven to thereby rotate the bags so that all of their surfaces are processed by the liquid. Then the carrier is raised and rotation of the supporting rollers is stopped, after which all of the bags are quickly discharged from the rack at the same time.

As shown, the rack is in the nature of a hanger suspended at its opposite ends from the trolleys 39, each of which comprises the pairs of wheels 40 running upon the track 41, the depending yokes 42 and the beam 43. The yokes are connected to the wheels of each pair and the beam extends beneath the track and is connected at its ends to the yokes and at its middle to a bracket 28.

What I claim as my invention is:

1. A carrier for annular work members comprising a rack having a frame including spaced top and bottom members and upright members spaced longitudinally of said frame to provide compartments for the work members, said upright members extending between and having the opposite ends thereof respectively secured to the top and bottom members, substantially parallel spaced rollers extending longitudinally of said frame for supporting the work members, upright rollers carried by said upright members for engaging the work members in adjacent compartments, and selectively operable means in the lower ends of the compartments for simultaneously lifting the work members off of the longitudinally extending rollers.

2. A carrier for annular work members comprising a rack having a frame including spaced top and bottom members and upright members spaced longitudinally of said frame to provide compartments for the work members, said upright members extending between and having the opposite ends thereof respectively secured to the top and bottom members, substantially parallel spaced rollers extending longitudinally of said frame for supporting the work members and laterally spaced pairs of upright rollers secured to said upright members in position to enable the rollers of each pair to respectively engage the work member in the adjacent compartments.

3. A carrier for annular work members comprising a rack having a frame including spaced top and bottom members and upright members spaced both transversely and longitudinally of said frame to provide compartments for the work members, said upright members extending between and having the opposite ends thereof respectively secured to the top and bottom members, substantially parallel spaced rollers extending longitudinally of said frame for supporting the work members and laterally spaced pairs of upright rollers secured to said upright members in position to enable the rollers of each pair respectively to engage the work member in the adjacent compartments.

4. A carrier for annular work members comprising a rack having a frame including spaced top and bottom members and upright members spaced longitudinally of said frame to provide compartments for the work members, said upright members extending between and having the opposite ends thereof respectively secured to the top and bottom members, substantially parallel spaced rollers extending longitudinally of said frame for supporting the work members, upright rollers carried by said upright members for engaging the work members in adjacent compartments, power means for driving one of said first mentioned rollers, a member extending for substantially the full length of the compartments and positioned between the first named rollers beneath the work members supported on the latter rollers, and selectively operable means for elevating said member to simultaneously raise the work members off of the first named rollers.

5. A carrier for annular work members comprising a rack having a frame including spaced top and bottom members and upright members spaced longitudinally of said frame to provide compartments for the work members, said upright members extending between and having the opposite ends thereof respectively secured to the top and bottom members, substantially parallel spaced rollers extending longitudinally of said frame and providing a common support for a plurality of work members, upright rollers carried by said upright members for engaging the work members in adjacent compartments, a member extending between the first named rollers in a position directly below the work members and supported for vertical movement, and selectively operable means for elevating said member to raise the work members off of the first named rollers.

6. A carrier for annular work members comprising a rack having a frame including spaced top and bottom members and upright members spaced longitudinally of said frame to provide compartments for the work members, said upright members extending between and having the opposite ends thereof respectively secured to the top and bottom members, substantially parallel spaced rollers extending longitudinally of said frame for supporting the work members, upright rollers carried by said upright members for engaging the work members in adjacent compartments, and means extending longitudinally of said frame and movable upwardly between said upright members into engagement with the work members to raise the same to a position to be discharged from said rack.

CLARENCE H. WHITCROFT.

REFERENCES CITED

The following references are of record in the file of this patent:

UNITED STATES PATENTS

| Number | Name | Date |
|---|---|---|
| 1,376,579 | Ramsdell | May 3, 1921 |
| 1,871,430 | Snow | Aug. 9, 1932 |
| 2,226,742 | Raymond | Dec. 31, 1940 |
| 2,370,496 | Seip | Feb. 27, 1945 |
| 2,395,593 | Trager | Feb. 26, 1946 |